United States Patent [19]
Klees

[11] Patent Number: 4,962,542
[45] Date of Patent: Oct. 9, 1990

[54] METHOD FOR REDUCING ARTIFACTS IN ERROR DIFFUSED IMAGES

[75] Inventor: Kevin J. Klees, Rochester, N.Y.

[73] Assignee: Eastman Kodak Company, Rochester, N.Y.

[21] Appl. No.: 237,486

[22] Filed: Aug. 29, 1988

[51] Int. Cl.⁵ ............... H04N 5/21; H04N 1/40
[52] U.S. Cl. .................. 382/54; 382/27; 358/167; 358/166; 358/463
[58] Field of Search ............ 382/54, 27; 358/166, 358/167, 284, 463; 364/572, 724.05, 724.17; 333/165, 166, 168

[56] References Cited

U.S. PATENT DOCUMENTS

| 4,231,065 | 10/1980 | Fitch et al. | 358/166 |
| 4,339,774 | 7/1982 | Temple | 358/283 |
| 4,482,923 | 11/1984 | Fischer et al. | 358/283 |
| 4,517,606 | 5/1985 | Yokomizo | 382/50 |
| 4,532,503 | 7/1985 | Pennebaker | 340/728 |
| 4,541,116 | 9/1985 | Lougheed | 382/54 |
| 4,573,070 | 2/1986 | Cooper | 358/167 |
| 4,578,713 | 3/1986 | Tsao et al. | 358/283 |
| 4,593,278 | 6/1986 | Koos, Jr. et al. | 340/748 |
| 4,625,330 | 11/1986 | Higgins | 382/54 |
| 4,694,342 | 9/1987 | Klees | 358/167 |

Primary Examiner—Leo H. Boudreau
Assistant Examiner—Michael R. Cammarata
Attorney, Agent, or Firm—Dennis R. Arndt

[57] ABSTRACT

A method for use in a recursive spatial filter which interchanges the value of a control pixel with that of the value of a predetermined one of the surrounding pixels in a pixel mask when a specific image pattern occurs in the digital image. The use of such a method eliminates certain highly visible grain patterns from the halftoned digital image while preserving the average gray level.

3 Claims, 7 Drawing Sheets

METHOD FOR REDUCING ARTIFACTS IN ERROR DIFFUSED IMAGES

TECHNICAL FIELD

The present invention relates to image reproduction and more particularly, to image data processing for bilevel printers or display devices and to the use oF a recursive spatial filter for eliminating certain artifacts in halftoned digital images processed using error diffusion, while preserving the average gray level.

BACKGROUND ART

Bilevel printing devices are characterized by having only two gray levels, i.e., black and white, with fixed sized spots arranged in a prearranged geometric pattern. For bilevel printing devices, by a manner in which image data is processed generally depends on the tyPe of data that is predominant e.g., text, continuous tone or halftone.

For the reproduction of continuous tone images, a number of processes have been developed based on pseudo halftone concepts, which mimic the traditional halftone printing process, wherein a variety of image gray levels are achieved through dot size variations. In these pseudo halftone processes, each halftone spot is made up of a matrix of binary picture elements, commonly referred to as pixels or pels, and the effective resolution of the reproduction system is correspondingly reduced.

There are other processes which do not mimic the halftone process, but instead utilize localized information in deciding whether a particular spot should be printed or not. Error diffusion is one such technique having good detail capabilities; however, it can also generate unwanted artifacts. Most digital imaging systems using digital halftoning have concentrated on halftoning algorithms that keep these artifacts or grain patterns to a minimum, this has resulted in very complex algorithms.

The present technique uses a simple error diffusion algorithm used in conjunction with a post processor to reduce the undesirable noise or artifacts. This combination of two simple techniques allows the process to be less complex than using one sophisticated halftoning algorithm.

DISCLOSURE OF THE INVENTION

Accordingly, an object of the present invention is to provide a method for eliminating certain artifacts in halftone digital images processed using error diffusion, while preserving the average gray level.

In accordance with the teachings of the present invention, a method for use in a recursive spatial filter is disclosed to identify artifacts or grain noise in an error diffused halftoned digital image. From the values of all the pels that currently form the pel mask the circuit produces a filter output pel value and a corresponding pair of feedback pel values. The pel mask contains pels from the incoming image and when a specific pattern is recognized, a pair of feedback pels are produced. Each time the lookup table is accessed and a specific pattern is recognized, a pair of feedback pels are generated to interchange or exchange two of the pel values in the pel mask, thereby breaking up artifacts such as grain noise.

The respective values of the output pel and the feedback pel pairs are both defined upon expected pel patterns that are in the image. By virtue of the respective values of the feedback pels, portions of the incoming image can be altered recursively to substantially preserve the gray scale while removing undesirable artifacts.

MODES OF CARRYING OUT THE INVENTION

Figures 1, 2:
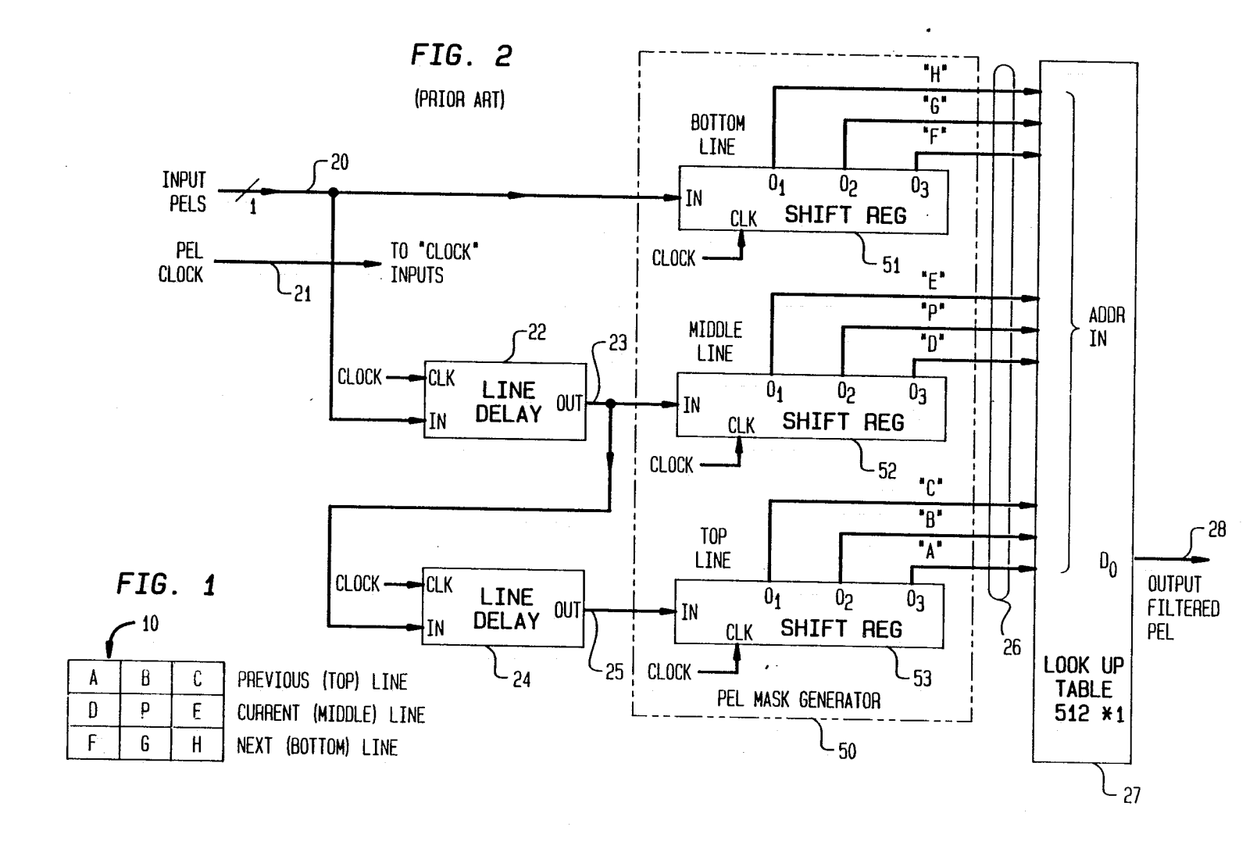
FIG. 1 illustrates a 3×3 pixel mask containing 9 pixels (A-P-H)
FIG. 2 is a block diagram of a spatial filter known to the art.

All spatial filters used for image enhancement and/or noise removal provide a value for a particular pel in an image, hereinafter referred to as pel P. To do so, the spatial filter operates on both pel P and also on the pels that surround pel P. The entire group of input pels that are used to define the value of a current pel are commonly referred to as a pel mask. A 3×3 pel mask is commonly used in spatial filters. FIG. 1 shows such a mask. A spatial filter operating on the 3×3 mask shown in FIG. 1 provides a value for pel P, given as input the values of nine pels A, B, C which occur in the previous (or top) scan line; pels D, P and E which occur in the current (or middle) scan line; and pels F, G and H which occur in the next (or bottom) scan line. For widest applicability, the inventive system will be discussed for use in conjunction with a 3×3 pel mask, specifically that shown in FIG. 1. Nonetheless, those skilled in the art will clearly recognize that the inventive filter can be easily expanded to operate with pel masks of other sizes and, after reading the following description, will understand how to expand the system accordingly.

A full understanding of the inventive method used in conjunction with a spatial filter can best be obtained by first considering a spatial filter known to the art and then focusing on the differences between the prior art spatial filter and the inventive spatial filter used in conjunction with the inventive method.

FIG. 2 shows a block diagram of a logical smoothing type spatial filter known to the art. This filter uses the values of all nine pels situated within a 3 by 3 pel mask as an address to access a lookup table. The lookup table stores the appropriate filtered output value of center pel P for each possible combination of the values of all nine pels occurring in the mask and provides that value as the filter output.

Specifically, this prior art spatial filter contains pel mask generator 50, line delays 22 and 24 and lookup table 27. Input pels are routed over lead 20 to shift register 51 located within pel mask generator 50. This shift register stores the three pels that form the bottom line of the pel mask (pels F, G and H shown in FIG. 1). To simultaneously form the middle line in the pel mask (pels, D, P and E shown in FIG. 1), the input pels are routed through line delay 22 which provides a delay of one scan line. The resulting delayed pels are applied, via lead 23, as input to shift register 52. As a result, while the pels in the bottom line are being shifted into register 51, three pels in the same corresponding positions in the middle scan line are being simultaneously shifted into register 52. The top line in the pel mask (pels A, B and C shown in FIG. 1) are similarly formed by further delaying the input pels by one additional scan line and applying the resulting pels as input to shift register 53. This additional delay of one scan line is provided by routing the pels provided at the output of line delay 22 through line delay 24. The pels produced by line delay 24 are applied, via lead 25, as input to shift register 53. Both line delays and the three shift registers are all synchronously clocked at the occurrence of each input pel by the application of a suitable clock pulse applied to pel clock lead 21. The outputs of all three shift registers are applied in parallel, via leads 26, as an address input to lookup table 27, typically a read only memory (ROM) of appropriate size. The location of the particular pel in the pel mask and carried by each address lead is shown in quotes. Each location in this table stores a pre-defined filtered value for the pel, P, located in the center of pel mask 10 given a unique combination of the values of all nine pels in the mask. Inasmuch as the values of these nine pels when taken together can produce 512 different combinations, this lookup table has 512 separately addressable locations. The output pel produced by lookup table 27 is applied to lead 28 as the output filtered value for pel P.

Figure 3:
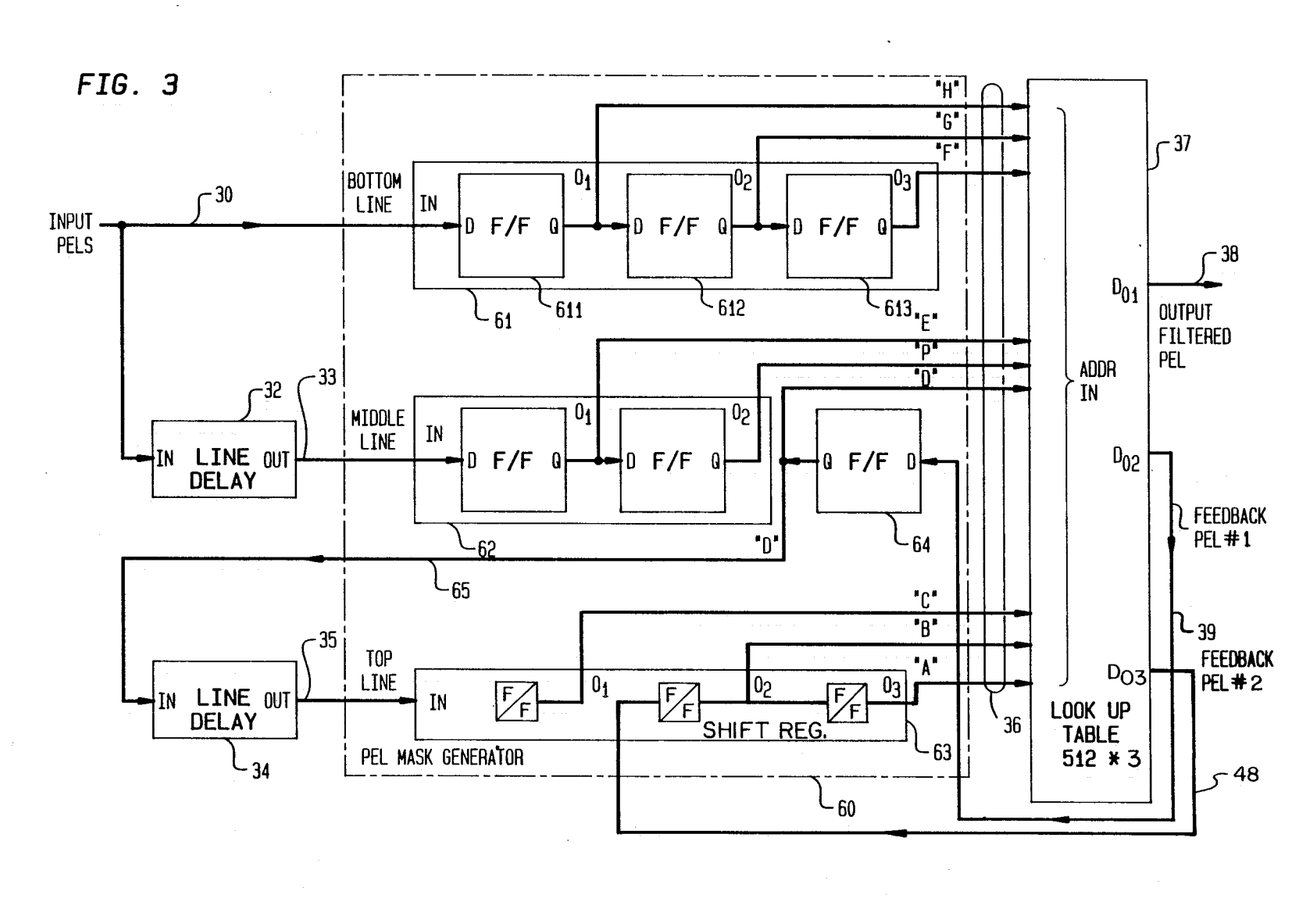
FIG. 3 depicts a block diagram of a preferred embodiment of a spatial filter constructed in accordance with the teachings of the present invention.

FIG. 3 shows a block diagram of a noise reduction filter constructed in accordance with the teachings of the inventive method. As shown, the filter contains pel mask generator 60, lookup table 37, and line delays 32 and 34. However, the inventive filter, in contrast to that of the prior art, is capable of generating more than one feedback pixel to recursively replace input image pixels. This capability allows the filter to perform operations involving the interchanging of pixel data point values, as well as simple recursive and non-recursive filter operations. The reader is directed to the following US patents for background information in recursive operation: U.S. Pat. No. 4,337,518 (issued to M. Ohnishi et al on June 29, 1982); U.S. Pat. NO. 4,231,065 (issued to R. C. Fitch et al on Oct. 28, 1980); U.S. Pat. No. 4,058,836 (issued to J. O. Drewery on Nov. 15, 1977); and U.S. Pat. No. 4,694,342 (issued to K. J. Klees on Sept. 15, 1987).

Specifically, as shown in FIG. 3, lookup table 37 provides three output bits: an output filtered pel on lead 38, a pel labeled "feedback pel #1" on lead 39, and lastly a pel labeled "feedback pel #2" on lead 48. These feedback pels act to replace two of the input image pels. Feedback pel #1 replaces input pel "D" and is stored within pel mask 10, specifically in flip/flop 64. Feedback pel #2 replaces input pel "B" and is stored within the pel mask 10 specifically in flip/flop 619. The value of these feedback pels are then recursively used as two of the address bits to access the lookup table 37. In addition, feedback pel #1 is also applied as input to line delay 34 to generate the top line of the pel mask 10.

The contents of the lookup table, including the output filtered pel and both feedback pels, are empirically determined from pre-defined features of the images that will be processed by the filter and are subsequently varied slightly ("fine-tuned") by suitable experimentation. This lookup table 37 can be implemented using programmable array logic (PAL).

The bottom line of the pel mask 10 is formed in the same manner as shown in FIG. 2. Specifically, input pels are successively shifted into shift register 61. This shift register contains three D type clocked flip/flops 611, 612 and 613. The outputs from these flip/flops are applied in parallel, via leads 36, to respective address inputs of lookup table 37.

To form the middle line of the pel mask 10, input pels are applied to line delay 32 which delays these pels by one scan line. The output of this line delay is applied as input to a two bit shift register 62 which itself contains two clocked D type flip/flops. This register provides the values of input pels "E" and "P" as two address bits to lookup table 37. The remaining pel, i.e. pel "D", that forms part of the middle line is provided as the feedback pel from lookup table 37. As discussed in detail below, the value of the feedback pel is pre-defined and accessed using the values of all nine pels that constituted the immediately preceding pel mask stored within Pel mask generator 60.

The top line of the pel mask is formed from past values of feedback pels. Specifically, each successive feedback pel stored within flip/flop 64 is routed to the input of line delay 34, via lead 65. The pels appearing at the output of this line delay are applied, via lead 35, as input to three bit shift register 63, which contains the same circuitry as shift register 61. All the flip/flops and line delays shown in FIG. 3 are clocked, in an identical fashion to that shown in FIG. 2, from a common source of pel clock pulses. To simplify the drawing, all these clock leads have been omitted from FIG. 3. These clock leads can be easily added by those skilled in the art.

Figure 4:
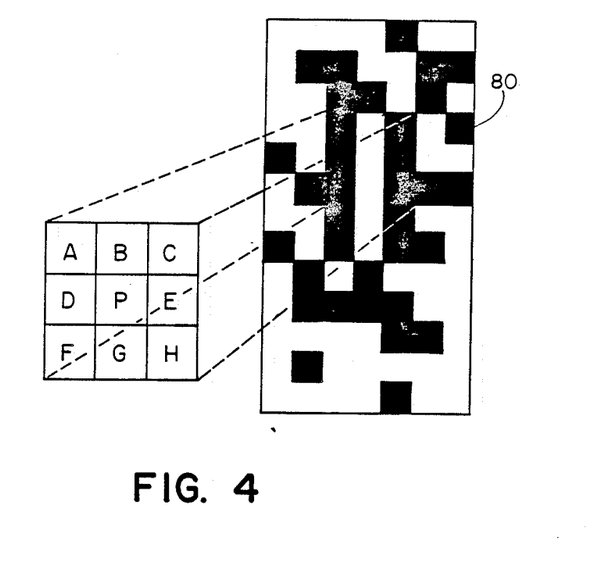
FIG. 4 depicts a pel pattern from the original error diffused image.

FIG. 4 depicts an enlarged portion (13×7 pixels or pels) of an error diffused digital image taken from that portion of the image that exhibits artifacts. Close examination of the image reveals that the artifact or grain pattern manifests itself as vertical lines which alternate from black to white. This alternation pattern is noticeable at the output or printing resolution of 200 to 400 dots/inch. The 3×3 pixel or pel mask illustrated in FIG. 1 may be used to determine when the artifact pattern occurs. For example, when the Pixels assume the following values:

| A = Black | B = White | C = Black |
| D = Black | P = White | E = Black |
| F = Black | G = White | H = Black |

When the pattern occurs, pixels A, C, D, E, F and H are black and pixels B, P and G are white. Although this pattern may only appear in small areas of the output image, it is quite noticeable and may readily be detected using such a mask. This mask is involved with the bi-level pixels produced by the halftoning algorithm. In essence, this mask is moved over the image one pixel at a time and one row at a time, and the specific pattern shown above is searched for. When this pattern is detected, the value of the central pixel or input pixel P is interchanged with pixel H which is the pixel in the lower right hand corner of the mask 10. The input pel P which was originally white is changed to black and pixel H which was originally black is changed to white. Thus, the affect is an interchanging or swapping of the pixel values P and H. This swapping of pixel values alters the structure of the noise so that it becomes less visible. It is this exchange of pixel values that preserves the average gray level in a group of bilevel pixels while eliminating the deleterious affect that these artifacts have on the image.

Figure 5:
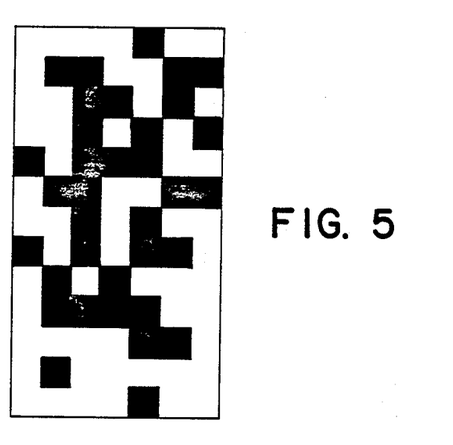
FIG. 5 depicts the modified pel pattern from the image after using the inventive spatial filter.

FIG. 5 illustrates the effect of using this filter on that portion of the image shown in FIG. 4. The 5 pixel tall white column 80 in FIG. 4 in the central part of that figure has been broken up, as shown in FIG. 5 using this filtering technique.

The image enhancement effect of this filter is more noticeable when viewing an entire image having a number of grain patterns at a resolution of 200 dots per inch or more instead of looking at a small portion of a larger image as shown in FIGS. 4 and 5. However, the detailed operation of the filter is more easily observed and understood with such an enlarged image portion. It is important to note that the number of black pixels in the sample image remain constant at 35 representing an average gray level of $35/(7 \times 13 = 38\%)$ which remains constant before and after the application of the filter.

Figure 6:
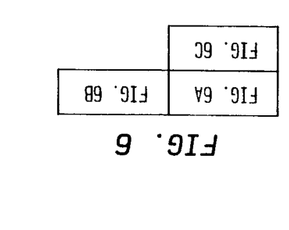
FIG. 6 shows the proper alignment of the drawing sheets for FIGS. 6A–6C.
Figure 6A:
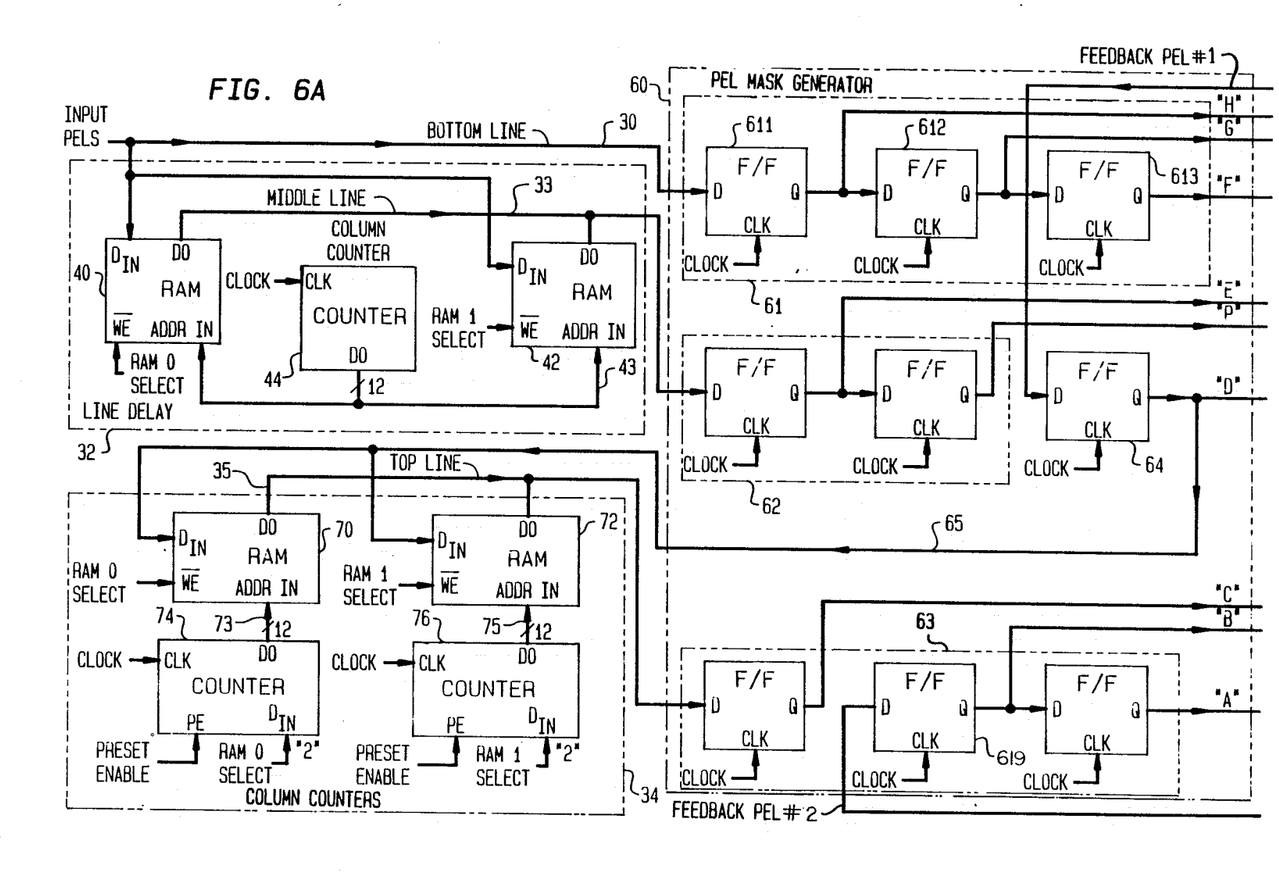
FIGS. 6A–6C collectively depict a detailed block diagram of the inventive spatial filter shown in FIG. 3.
Figure 6B:
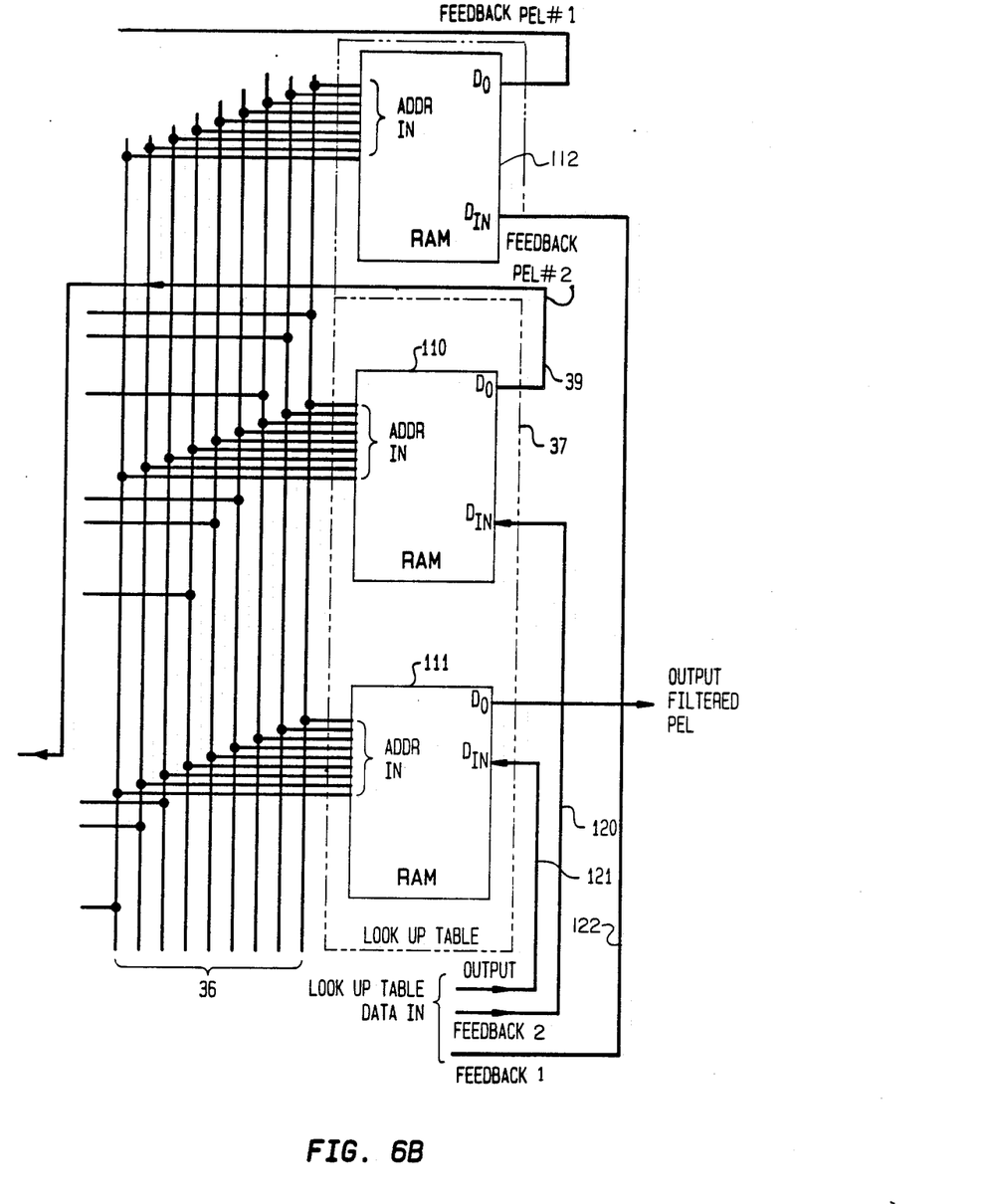
Figure 6C:
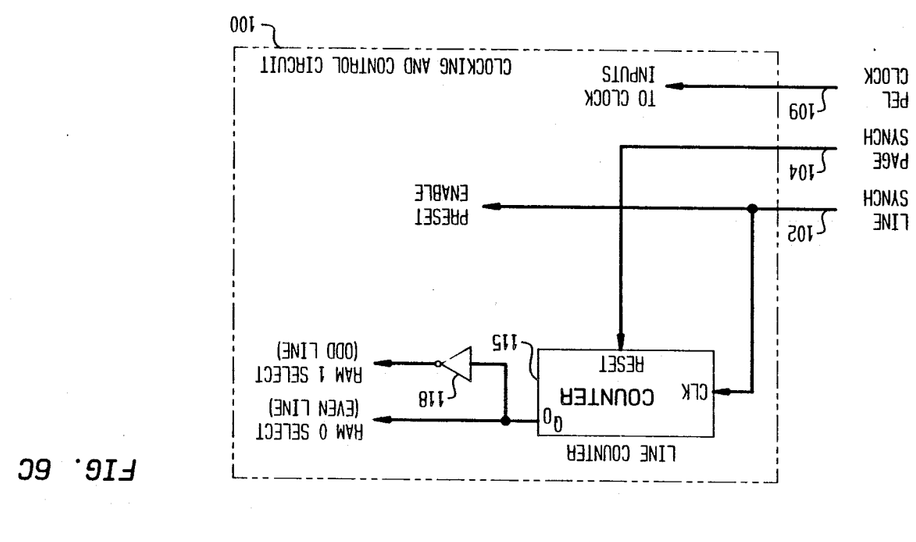

A detailed block diagram of the inventive spatial filter, shown in FIG. 3, is depicted in FIGS. 6A-6C, for which the proper alignment of the drawing sheets is shown in FIG. 6. To simplify the drawing, well-known chip select signals and associated control circuitry have been omitted from FIG. 6 but can be easily added by those skilled in the art.

As previously described, the spatial filter includes line delays 32 and 34, pel mask generator 60 and lookup table 37 and, in addition, clocking and control circuit 100. Pel mask generator 60 consists of nine separate clocked D type flip/flops. Eight of these flip/flops form three separate shift registers: three bit shift registers 61 and 63 and two bit shift registers 62. The remaining flip/flop is flip/flop 64 which stores the feedback pel #1 provided by the lookup table 37 over feedback lead 39. The outputs of all these flip/flops are applied, as discussed previously, over address leads 36 to the address inputs of lookup table 37. This lookup table consists of three separate RAM memories, each of which is illustratively a 512 location by a 1 bit static RAM. RAM 110 stores the feedback pel #2 values; RAM 112 stores feedback pel #1, while RAM 111 stores the output filtered (non-recursive) pel values. The same address is applied over address leads 36 to all RAMs. When a noise pattern is applied as input to the lookup tables, the output filtered pel produced by RAM 111 and the feedback pels produced by RAMs 110 and 112 are both changed to swap pixels "P" and "H". Alternatively, when a noise-free pattern is applied as input to the lookup tables, the output filtered pel produced by RAM 111 is unchanged, and the feedback pels produced by RAMs 110 and 112 also remain unchanged. Although lookup table 37 is shown containing RAM circuits, read only memory (ROM) or programmable read only memory (PROM) can be used in lieu oF RAM circuits. Alternatively, the determination of whether an input pel is noise or image detail can be made using an appropriate combinatorial logic circuit or an appropriately programmed array logic (PAL) circuit in lieu of the lookup tables. Such a circuit would operate in response to the values of the pels that form the pel mask.

The data stored in each RAM can be changed by applying desired data to leads 120, 121 and 122. In addition, suitable address information would also need to be applied in parallel to address leads 36 along with suitable chip select and write enable signals (both of which are well known but not shown) to the desired RAM. In this manner, the characteristics of the inventive spatial filter can be readily altered to match changing image conditions.

Line delays 32 and 34 are implemented using RAM memories and counters. In particular, each line delay, such as line delay 32, contains two separate RAM memories; one to store an even line in the image and another to store an odd line in the image. If each scan line contains 4096 (4K) bilevel pels, then each RAM in the line delay is illustratively organized as 4K by 1 bit. These RAMs can be used for scan lines that contain less than 4K bilevel pels but must be increased in size to handle larger scan lines. In any event, to increase the processing speed of the filter, both RAM memories in each line delay operate on an interleaved basis: pel values from an even numbered scan line are sequentially written into one RAM memory, e.g. RAM 40, while pel values for an odd scan line are being sequentially read from the other RAM memory, e.g. RAM 42. Alternatively, if slow speed operation can be tolerated, then a single RAM memory which operates on a read-modify-write basis can be used within each line delay in lieu of two separate RAM memories. Control over each RAM in both line delays is provided through suitable select signals, as discussed in detail below, that are produced by clocking and control circuit 100 and are alternately applied to the write enable inputs of each RAM in each line delay. Within line delay 32, counter 44 counts each pel in a scan line in order to generate an appropriate address, via address leads 43, to RAM memories 40 and 42. This counter is incremented at the occurrence of each incoming pel by the application of a pel clock signal applied to pel clock lead 109. RAM memories 70 and 72, located within line delay 34, operate in the same manner as described above. Although a full scan line is being written into each RAM within line delay 34, the first two pels are not read out of RAMs 70 and 72 for each incoming scan line. For these RAMs, reading begins with the third pel in each scan line. Removing the first two pels is necessary if the filter is to synchronously operate with incoming pels. In particular, one pel clock cycle is required to access the feedback pel from RAM 110 located within lookup table 37, and a second pel clock cycle is required to clock the recursive feedback pel into flip/flop 64. These operations necessitate that the first two pels be ignored. Since a full scan line is always alternately written into both RAMs 70 and 72, separate counters 74 and 76 are used to provide separate read and write addresses, over address leads 73 and 75, respectively.

At the beginning of each scan line during a read operation, and specifically at the occurrence of a horizontal synchronization (line sync) pulse appearing on line 102, one of the counters, i.e. that used for a subsequent read operation, within each line delay is loaded (preset) with the value "two". This is accomplished by applying high digital levels, via the select signals, to the parallel data in leads of that counter which together corresponding to the value "two" and then, in response to the line sync pulse appearing on lead 102, applying a pulse to the preset enable (PE) input of the counter. At the same time, the line sync pulse causes the other counter, i.e.

that used for a subsequent write operation, in each line delay to be reset to zero. In addition, counter 115 located within clocking and control circuit 100 counts the line number of each scan line. As a result, the least significant bit of this counter toggles at the beginning of each successively occurring scan line. The output of this bit $Q_0$, is applied as the RAM 0 (even line) select signal, and, through inverter 118, as the RAM 1 (odd line) select signal. This counter is reset at the beginning of each incoming image by the page sync signal appearing on input lead 104. The line sync signal appearing on input lead 102 provides the pre-set enable signal at the beginning of each scan line.

Apparatus and methods according to this invention permit the ready reproduction of continuous tone pictures in halftone form on a variety of displays, printers and other output devices which can be characterized as bilevel, that is to say that for each picture element, there is either a dot of fixed size or no dot at all.

Figure 7:
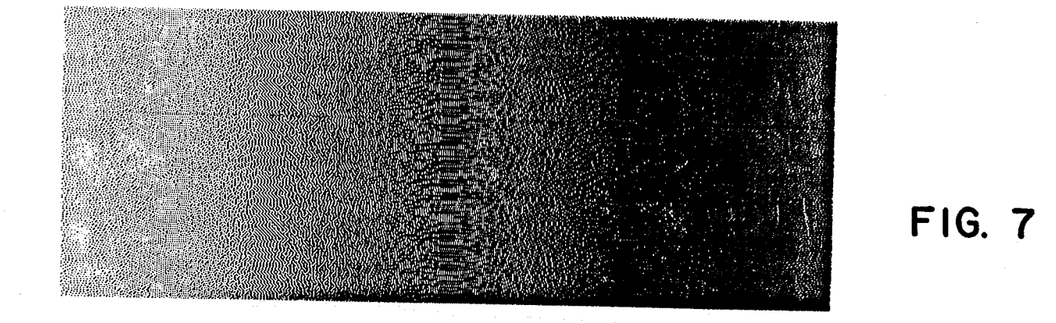
FIG. 7 shows an area of an error diffused image where the artifacts are present in the midtone grayscale area (the artifacts are vertical lines that alternate from black to white)

It has been explained that dispersed dot halftone pictures obtained from the methods suggested in the prior art generally contain visual artifacts of the dot distribution which are not present in the original picture. FIG. 7 shows an area of an error diffused image. The artifacts are present in the midtone grayscale areas. Close examination reveals that the artifacts are vertical lines which alternate from black to white. This alteration occurs at the output printing resolution.

Figure 8:
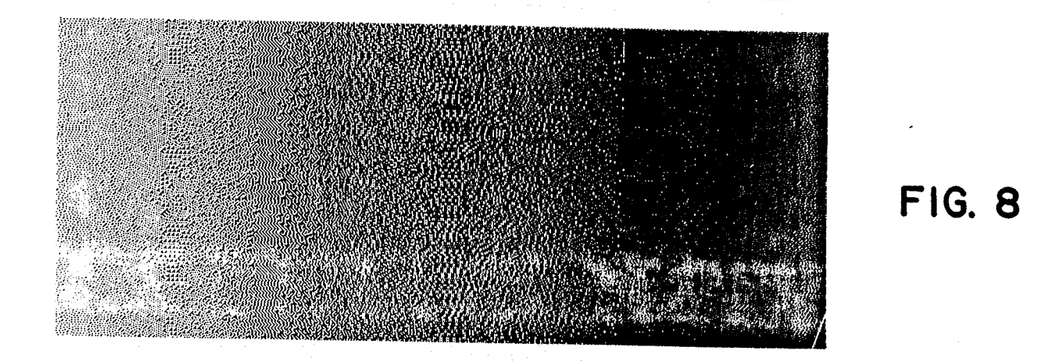
FIG. 8 shows the same image shown in FIG. 7 after using the inventive artifact removal filter.

FIG. 8 illustrates the same image after the removal of the artifacts by the inventive filter. The effect of this filtering is to "break-up" the vertical bars by introducing a checkerboard pattern when selected pixels are interchanged in the pel mask. At resolutions of 200-400, the checkerboard pattern is much less visible than the vertical bar pattern.

Clearly, those skilled in the art recognize that for multi-level images—i.e. images that contain colors or gray scale values, the value of each pel is multi-bit and represents the particular color or gray scale associated with that pel. Although the invention has only been described in terms of apparatus that removes artifacts or visible grain patterns from bilevel images (black and white images), this apparatus can be readily extended to accommodate multi-level images by appropriately increasing the size of the lookup table and registers, and storing additional empirically derived patterns within the table. In addition, the filter can also be used to filter noise groupings having more than two contiguous pels. To do so, the pel mask could be appropriately expanded to, for example, a 3 by 4, a 4 by 4 size or an even larger size. In addition, the lookup table would also be expanded as required. For example, for a 4 by 4 mask, each RAM would require 16 address lines, or 64K separate addressable locations. While such an enlarged filter would produce one output filtered pel at a time, multiple pels may be used as feedback pels. For example, for a 4 by 4 pel mask, the four central pels in the mask may all be recursively fed back to occupy appropriate positions in an input pel mask. Alternatively, for a 3 high by 4 wide pel mask, the two central pels may be recursively fed back. As the mask size increases, so does the number of feedback pels.

In addition, several lookup tables can be incorporated into the inventive spatial filter or simple combinatorial logic may be used to determine if the desired pattern is present. Each lookup table would store a different set of patterns. The particular table that would be used would depend upon pre-defined characteristics of the images. For example, one table might be specifically applicable for filtering textual images containing certain character sets; another filter might be useful for images containing other character sets; while a third table might be useful for graphical or non-textual images. The particular table to be used can be selected by a user, through an appropriate switch, or by equipment situated downstream of the spatial filter, e.g. by suitable motion detectors or other picture processing systems, given certain characteristics of the filtered image. One of those characteristics might be the percentage of black to white pels that form the image. If the image appears too dark, e.g. 40% black, then a different table can be selected to bring subsequent filtered images closer to a normal range, such as 80% white for textual images. Alternatively, if the image is to be transmitted, then the selected table might be one which maximizes run length (i.e. the number of pels of the same color) in order to adequately compress the images. Separate selectable tables for the recursive feedback pels and other selectable tables for the filtered output pels can also be employed if needed.

ADVANTAGES AND INDUSTRIAL APPLICABILITY

Use of the present invention offers advantages in the area of digital image enhancement where bilevel devices are used to output computer generated graphics, for example. One field of applicability would be in medical electronics where it is often necessary to provide hard copies of the outputs of ultrasound scanners and nuclear imaging devices.

What is claimed is:

1. A method for use in a recursive spatial filter for eliminating visible predefined grain patterns of pel values in scanned from halftone digital images, said method comprising the steps of:

produced, in response to the pel values that form the incoming image, a pel mask having an input pel associated therewith, said pel mask defining an array of pels having columns and rows including said input pel wherein each of said pels in said mask has a corresponding pel value;

storing in memory, said predefined grain patterns of pel values;

determining in response to the values of said pels that form said pel mask, whether said input pel is a part of a grain pattern; and outputting from said memory, at least two feedback pels that interchange the value of said input pel with that of one of the pels in the outermost columns if said input pel is determined to be part of a grain pattern.

2. The method in claim 1 wherein said pel mask producing step further comprises the steps of:

applying at least one of the values of the pels that form a bottom line of said pel mask as a first portion of an address to memory;

delaying said incoming pel values by a line in order to produce values of pels that will occupy a middle line of said pel mask;

applying the values of at least one of said middle line pel values as a second portion off the address to memory;

applying one of the said feedback pel values in order to produce values of pels that will occupy a top line of said pel mask; and applying the values of at least one of said pels in said top line as a third portion of the address to memory.

3. A method for use in a recursive spatial filter for eliminating visible predefined grain patterns of pel values in scanned bilevel digital images, said method comprising the steps of:

producing, in response to the pel values that form the incoming image, a pel mask having an input pel associated therewith, said pel mask defining an array of pels having columns and rows including said input pel wherein each of said pels in said mask has a corresponding pel value;

storing in memory, said predefined grain patterns of pel values;

determining in response to the values of said pels that form said pel mask, whether said input pel is part of a grain pattern; and said memory outputting at least two feedback pels so as to interchange the value of said input pel with that of one of the pels in the outermost columns.

* * * * *